US011583122B2

(12) United States Patent
Rogers et al.

(10) Patent No.: US 11,583,122 B2
(45) Date of Patent: Feb. 21, 2023

(54) SECURE PACKAGE RECEPTACLE FOR RECEIVING DRONE DELIVERIES (71) Applicants: Orlando Rogers, Miami, FL (US); Juan Enrique Perez, Miami, FL (US)

(72) Inventors: Orlando Rogers, Miami, FL (US); Juan Enrique Perez, Miami, FL (US)

( * ) Notice: Subject to any disclaimer, the term of this patent is extended or adjusted under 35 U.S.C. 154(b) by 0 days.

(21) Appl. No.: 16/526,542

(22) Filed: Jul. 30, 2019

(65) Prior Publication Data

US 2021/0030185 A1    Feb. 4, 2021

(51) Int. Cl.
*A47G 29/14*   (2006.01)
*G06Q 10/083*  (2023.01)
*A47G 29/30*   (2006.01)
*A47G 29/124*  (2006.01)

(52) U.S. Cl.
CPC ....... *A47G 29/141* (2013.01); *A47G 29/1251* (2017.08); *A47G 29/30* (2013.01); *G06Q 10/083* (2013.01); *A47G 2029/145* (2013.01)

(58) Field of Classification Search
CPC .............. A47G 29/141; A47G 29/1251; A47G 29/1214; A47G 29/16; A47G 29/30; A47G 2029/145; A47G 2029/148; A47G 2029/149; A47G 2029/146; G06Q 10/083; G06Q 10/0832; G06Q 50/28; B64C 39/02; B64C 39/024; B64C 2201/128; B64D 1/02; B64D 1/12; B64F 1/32; G07C 9/00912; E05B 65/0075; B65F 1/16; B65F 1/12; B65F 1/1426
USPC ............ 232/17, 19, 45, 34–36, 51; 340/569, 340/568.1, 5.73; 244/114 R, 118.1, 244/118.2, 137.1, 137.4; 200/61.63; 705/330
See application file for complete search history.

(56) References Cited

U.S. PATENT DOCUMENTS

| | | | |
|---|---|---|---|
| 6,629,634 B2 | 10/2003 | Simmons | |
| 6,799,716 B1 | 10/2004 | Kuelbs | |
| 7,256,691 B2 * | 8/2007 | Awobue | A47G 29/124 340/545.6 |
| 7,320,427 B2 * | 1/2008 | Prestwich | A47G 29/22 232/51 |
| 8,123,113 B1 | 2/2012 | Hartman | |
| 9,211,025 B1 * | 12/2015 | Elhawwashy | A47G 29/20 |

(Continued)

FOREIGN PATENT DOCUMENTS

| | | |
|---|---|---|
| JP | 6201092 | 9/2017 |
| WO | 2017085316 | 5/2017 |

(Continued)

*Primary Examiner* — William L Miller
(74) *Attorney, Agent, or Firm* — The Concept Law Group, PA; Scott D. Smiley; Scott M. Garrett (57) ABSTRACT A postal and package receptacle includes a main body that has an open top and a lid over the top that is movable between an open position and a closed position. The lid is moved from the open to the closed position upon receiving an open command via a wireless communication, whereupon a package can be placed in the interior of the main body. After a package is placed in the interior of the main body, the lid can be closed. A drone can be programmed to deliver a package to the postal and package receptacle and upon arriving at the location of the postal and package receptacle, the drone can communicate with the postal and package receptacle to issue the open and close commands, accordingly.

16 Claims, 10 Drawing Sheets

(56) References Cited

U.S. PATENT DOCUMENTS

| | | | |
|---|---|---|---|
| 9,840,340 B2 | 12/2017 | O'Toole | |
| 10,026,054 B1 | 7/2018 | Staton et al. | |
| 10,028,606 B1* | 7/2018 | Ritchie | G07C 9/00912 |
| 10,039,401 B1* | 8/2018 | Romanucci | A47C 7/628 |
| 10,874,240 B2* | 12/2020 | Lewis | B64C 39/024 |
| 10,875,708 B2* | 12/2020 | Wolfenden | B65F 1/12 |
| 2001/0045180 A1* | 11/2001 | McCormick | A47G 29/141 109/53 |
| 2015/0175276 A1* | 6/2015 | Koster | B64C 39/024 244/114 R |
| 2015/0183528 A1* | 7/2015 | Walsh | A47G 29/141 701/3 |
| 2015/0297013 A1* | 10/2015 | Bolles | A47G 29/1251 232/17 |
| 2016/0033966 A1* | 2/2016 | Farris | A47G 29/141 701/15 |
| 2016/0235236 A1 | 8/2016 | Byers et al. | |
| 2017/0039510 A1 | 2/2017 | Ogilvie et al. | |
| 2017/0091710 A1* | 3/2017 | Van Dyke | H04L 67/42 |
| 2017/0116568 A1* | 4/2017 | Pleis | G06Q 10/0832 |
| 2017/0147975 A1 | 5/2017 | Natarajan et al. | |
| 2017/0228692 A1 | 8/2017 | Pargoe | |
| 2018/0049575 A1* | 2/2018 | Yamrick | G06Q 10/0836 |
| 2018/0070753 A1* | 3/2018 | Eveloff | H04W 4/025 |
| 2018/0075688 A1 | 3/2018 | Liu | |
| 2018/0092484 A1* | 4/2018 | Lewis | A47G 29/20 |
| 2018/0105289 A1 | 4/2018 | Walsh et al. | |
| 2018/0225628 A1* | 8/2018 | Roy | G07C 9/00912 |
| 2018/0228311 A1* | 8/2018 | Bloom | B64C 39/024 |
| 2018/0352988 A1* | 12/2018 | Ortiz | E05B 65/06 |
| 2019/0039751 A1* | 2/2019 | Janssen | B64C 39/024 |
| 2020/0048951 A1* | 2/2020 | Herschap | B64D 1/02 |
| 2020/0113365 A1* | 4/2020 | Shobe | B65D 81/18 |
| 2020/0288895 A1* | 9/2020 | Bennet | H04W 12/03 |
| 2020/0390260 A1* | 12/2020 | Romanucci | A47G 29/30 |
| 2021/0015286 A1* | 1/2021 | McCloskey, III | A47G 29/20 |
| 2021/0022536 A1* | 1/2021 | Anderson | A47G 29/141 |
| 2021/0045563 A1* | 2/2021 | Bartley-Clark | A47G 29/141 |

FOREIGN PATENT DOCUMENTS

| | | |
|---|---|---|
| WO | 2017196190 | 11/2017 |
| WO | 2018012767 | 1/2018 |

* cited by examiner

SECURE PACKAGE RECEPTACLE FOR RECEIVING DRONE DELIVERIES

FIELD OF THE INVENTION

The present invention relates generally to automated delivery receptacles, and more particularly to an automated delivery receptacle having a retractable top for receiving drone deliveries.

BACKGROUND OF THE INVENTION

With the increasing popularity of e-commerce there has been a corresponding rise in parcel deliveries. For many people, receiving parcels has not changed; a delivery service vehicle hauls the parcel to a destination address and typically leaves the parcel at front door. The increase in such deliveries has likewise given rise to an increase in parcel theft, where parcels are stolen from the destination address before the intended recipient can take possession of the parcel. The thieves are indiscriminate, taking whatever package they find with no knowledge of what is inside the package. Sometimes the items stolen are inexpensive, sometimes they are valuable, and increasingly the packages can include medicine. The losses due to package theft are significant, with responsibility often falling on the merchant and/or delivery service. This has given rise to a secondary form of theft where the recipient fraudulently claims to have not received the package, resulting in a refund or a second item being shipped to the person.

As a result, merchants and delivery services have an interest in reducing package theft and fraud. However there have been few options that have been widely accepted. A common solution is to simply pay for a delivery box at a postal facility (government or private) that will receive deliveries and hold them for the customer. Some people have provided their own lock boxes for receiving deliveries at their residences, however, these are not standardized, and delivery personnel are not required to use them. They also don't solve the problem when multiple deliveries arrive on the same day since the first package to be delivered will be safely locked in the box, but subsequently delivered packages can then not be locked in the delivery box as it is then already locked.

At the same time, delivery services are looking at increasing their capacity in cost effective ways. Conventional delivery services use delivery vehicles to drive to each address/destination for packages. Packages can be grouped according to region/neighborhood and put on the same delivery vehicle. The costs associated with maintaining a fleet of road-going delivery vehicles is substantial. They require a competent driver, equipment to track packages, fuel, maintenance, licensing and other taxes, and insurance, among other costs. As a result, delivery service operators have been looking at aerial delivery using drone aircraft to deliver smaller packages. Drones have the potential to increase the volume of deliveries without increases in associated costs. However one concern with drone use is that they could make package theft easier as thieves can simply follow a drone to the delivery destination, and the lack of an actual human delivery person may embolden thieves to take packages.

Therefore, a need exists to overcome the problems with the prior art as discussed above.

SUMMARY OF THE INVENTION

Some embodiments of the disclosure provide a package receptacle that includes a main body container having an interior, a front, a back, a first side and a second side opposing each other between the front and the back, and a top that is open. The package receptacle can further include a lid mounted at the top of the main body and configured to move horizontally between an open position and a closed position, wherein in the closed position the top is completely covered by the lid, and in the open position the lid is moved towards the back of the main body to expose the open top. The package receptacle can further include a drive system mounted to the lid at a bottom side of the lid that moves the lid between the open and closed positions. The package receptacle can further include a controller operably coupled to the drive system and configured to control the drive system to move the lid selectively to the open position and the closed position. The package receptacle can further include a wireless network transceiver coupled to the controller and configured to receive commands to move the lid to the open position and provide the commands to the controller.

In accordance with another feature, the wireless network transceiver is a local wireless network transceiver, the package receptacle further includes a cellular data network transceiver.

In accordance with another feature, a solar array is mounted on a top of the lid.

In accordance with another feature, the controller is responsive to the commands, and wherein the controller is configured to operate the drive system to open the lid only when a pre-shared key is provided in the received command that matches a pre-shared key in a memory associated with the controller.

In accordance with another feature, the lid is mounted on opposing telescoping roller tracks disposed on the first side and the second side of the main body.

In accordance with another feature, the main body comprises a front door having an interior portion and an exterior portion at an angle to the interior portion, wherein the front door is pivotally mounted at the front of the main body to allow the exterior portion to be pulled down causing the interior portion to rise up, thereby blocking access to the interior of the main body.

In accordance with another feature, a rear door at the rear of the main body includes a lock which, when opened, allows access to the interior of the main body.

Some embodiments of the disclosure provide a postal and package receptacle including a main body container having an interior, a front, a back, a first side and a second side opposing each other between the front and the back, and a top that is open. The postal and package receptacle can further include a lid mounted at the top of the main body and configured to move horizontally between an open position and a closed position, wherein in the closed position the top is completely covered by the lid, and in the open position the lid is moved towards the back of the main body to expose the open top. The postal and package receptacle can further include a wireless network transceiver configured to receive an open command to move the lid to an open position and to receive a close command to move the lid to a closed position. The postal and package receptacle can further include a drive system mounted to the lid at a bottom side of the lid, the dive system including a drive motor that is powered by a battery, the drive system being configured to move the lid to the open position in response to the open command being received by wireless network transceiver, and wherein the drive system is further configured to move the lid to the closed position in response to the close command being received by wireless network transceiver;

a front door at the front of the main body that is configured to receive postal deliveries; and a rear door at the rear of the main body that include a lock and which, when opened, allows access to the interior of the main body.

In accordance with another feature, a graphical receptacle identifier is disposed in the interior of the main body so as to be viewable when the lid is in the open position.

In accordance with another feature, a cellular transceiver is configured to receive a pre-shared key for a package delivery, and wherein the open command includes the pre-shared key.

In accordance with another feature, the drive system is configured to open the lid only when the open command includes the pre-shared key.

In accordance with another feature, the postal and package receptacle is configured to transmit a message via the cellular transceiver to an owner of the postal and package receptacle upon receiving the open command.

In accordance with another feature, the lid is mounted on opposing telescoping roller tracks disposed on the first side and the second side of the main body.

In accordance with another feature, the front door has an interior portion and an exterior portion at an angle to the interior portion, wherein the front door is pivotally mounted at the front of the main body to allow the exterior portion to be pulled down causing the interior portion to rise up, thereby blocking access to the interior of the main body.

In accordance with another feature, a solar array is mounted on a top of the lid that is coupled to the battery.

Some embodiments of the disclosure provide a method that includes providing a postal and package receptacle having a main body having an opening at a top of the main body, a lid mounted at the top of the main body that is moveable horizontally between an open position and a closed position, a drive system including a drive motor mounted on the lid to move the lid between the open and closed positions, the postal and package receptacle further include a wireless network transceiver. The method can further include receiving, at the wireless network transceiver, an open command and in response to receiving the open command, the drive system moving the lid from the closed position to the open position. The method can further include receiving, at the wireless network transceiver, a close command, and in response to receiving the close command, the drive system moving the lid from the open position to the closed position. In accordance with another feature, providing the postal and package receptacle further comprises providing the postal and package receptacle having a front door at a front of the main body and a rear door at the rear of the main body.

In accordance with another feature, providing the postal and package receptacle further comprises providing the postal and package receptacle having a cellular transceiver, the method further comprises, prior to receiving the open command, receiving a pre-shared key at the postal and package receptacle via the cellular transceiver, and wherein the drive system moving the lid from the closed position to the open position is only performed when the open command includes a copy of the pre-shared key.

In accordance with another feature, in response to receiving the open command, the postal and package receptacle transmitting a message to an owner of the postal and package receptacle that a package has been received.

Although the invention is illustrated and described herein as embodied in a secure package receptacle for receiving drone deliveries, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time.

"In the description of the embodiments of the present invention, unless otherwise specified, azimuth or positional relationships indicated by terms such as "up", "down", "left", "right", "inside", "outside", "front", "back", "head", "tail" and so on, are azimuth or positional relationships based on the drawings, which are only to facilitate description of the embodiments of the present invention and simplify the description, but not to indicate or imply that the devices or components must have a specific azimuth, or be constructed or operated in the specific azimuth, which thus cannot be understood as a limitation to the embodiments of the present invention. Furthermore, terms such as "first", "second", "third" and so on are only used for descriptive purposes, and cannot be construed as indicating or implying relative importance.

In the description of the embodiments of the present invention, it should be noted that, unless otherwise clearly defined and limited, terms such as "installed", "coupled", "connected" should be broadly interpreted, for example, it may be fixedly connected, or may be detachably connected, or integrally connected; it may be mechanically connected, or may be electrically connected; it may be directly connected, or may be indirectly connected via an intermediate medium. As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. In this document, the term "longitudinal" should be understood to mean in a direction corresponding to an elongated direction of the length of the lid. The terms "instruction code," "program," "software application," and the like as used herein, are defined as a sequence of instructions designed for execution on a computer system, and specifically on a processor. "Instruction code," a "program," "computer program," or "software application" may include a subroutine, a function, a procedure, an object method, an object implementation, an executable application, an applet, a servlet, a source code, an object code, a shared library/dynamic load library and/or other sequence of instructions designed for execution on a computer system. Those skilled in the art can understand the specific meanings of the above-mentioned terms in the embodiments of the present invention according to the specific circumstances.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

Embodiments of the disclosure provide a secure package receptacle for receiving drone deliveries, and which secures delivered packages. The secure package receptacle of the disclosed embodiments includes a main body on which a movable lid is mounted. In some embodiments the lid covers the entire top of the package receptacle, and moves horizontally to expose and provide access to the interior of the main body so that a package can be deposited into the interior of the main body. After delivery, the lid can be closed and locked to secure the package inside the package receptacle, out of sight. In operation, a drone is programmed to fly to the location of the package receptacle, communicate with the package receptacle to verify it is authorized to deliver a package, whereupon the package receptacle will open the lid to receive the package. The drone can take a photograph of the package in the package receptacle as evidence of delivery, and then the package receptacle can close and lock the lid. In some embodiments the package receptacle can then send a message to the owner or operator of the package receptacle to indicate that a delivery has been received.

DETAILED DESCRIPTION

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

Figure 1:
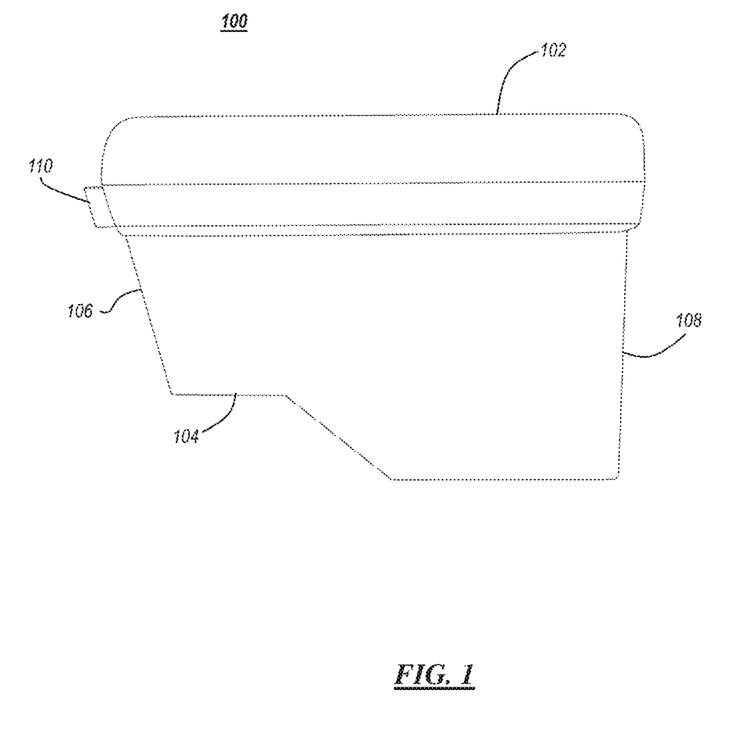
FIG. 1 is a side elevational view of a package receptacle that is configured to receive and secure packages delivered by a drone, in accordance with some embodiments.

FIG. 1 is a side elevational view of a package receptacle 100 that is configured to receive and secure packages delivered by a drone, in accordance with some embodiments. FIGS. 2-4 and 6 show substantially the same package receptacle so common reference numerals will be used throughout these drawings. The package receptacle 100 includes a main body 104 which defines an interior space in which parcels, packages, letters, and other delivered items can be received and secured. The main body has a front 106 and a back 108. A lid 102 is mounted on the top of the main body, and the top is otherwise open so as to be able to receive a package through the top when the lid 102 is moved into an open position. As shown here in FIG. 1, the lid 102 is in a closed position.

Figure 2:
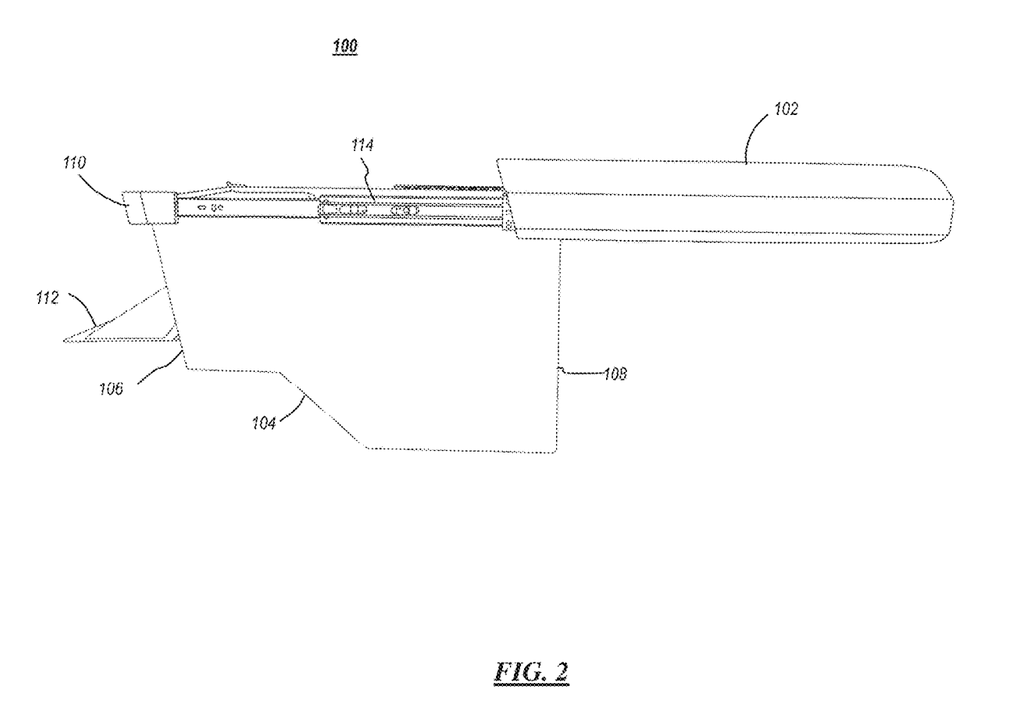
FIG. 2 is a side elevational view of a package receptacle that is configured to receive and secure packages delivered by a drone, with the lid open, in accordance with some embodiments.

The lid 102 is moved automatically by a controller mounted inside the lid 102 that operates a drive system that is also mounted inside the lid 102. The lid can be opened in response to a command or a request received over a local wireless network interface or a wireless device to device interface, and will then appear substantially as shown in FIG. 2. For example, the lid 102 or another part of the receptacle 100 can include a wireless local area network radio transceiver that operates according to Specification 802.11 of the Institute of Electrical and Electronics Engineers (IEEE), also known commonly as "WiFi." Alternatively, or in addition, the lid or another part of the receptacle 100 can include a personal area network radio transceiver can be used such as those defined by Specification 802.15 of the IEEE, which include the protocols know commonly as BLUETOOTH and ZIGBEE. The lid can be commanded to open by the owner or other authorized person using, for example, a cellular phone device running an appropriately designed application program. The lid 102 can include a locking mechanism that is operated by circuitry in the lid 102 or at another portion of the receptacle 100, and upon receiving a command to open, the lid 102 unlocks and opens. Likewise, a delivery drone can communicate with the receptacle 100 to indicate that a valid delivery is to be completed, and in response the controller can cause the lid 102 to open to receive the delivery.

FIG. 2 is a side elevational view of a package receptacle 100 that is configured to receive and secure packages delivered by a drone, with the lid 102 open, in accordance with some embodiments. The lid 102 can be mounted on telescoping roller tracks 114 on the outside of the main body 104 at the top of the main body 104 and which extend in the direction the lid 102 is to move. Also shown here is the front door 112 in an open position to allow the delivery of letters and similar post materials. Upon closing the front door 112 the post materials deposited at the front door 112 will be lifted by the front door to slide down into the main body 104.

Figure 3:
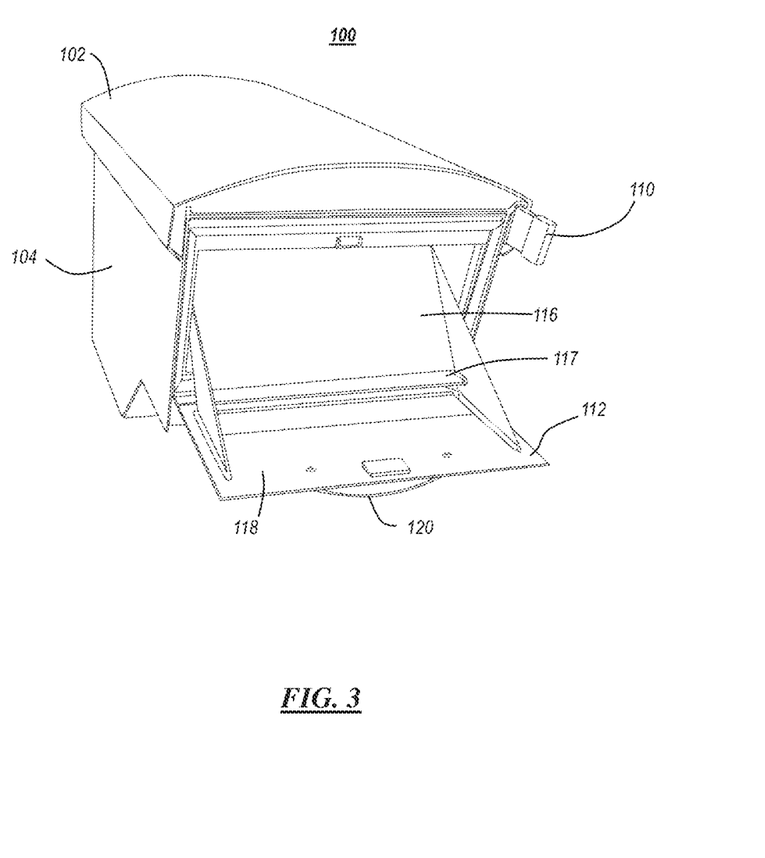
FIG. 3 is a front left perspective view a package receptacle that is configured to receive and secure packages delivered by a drone, with the front door open, in accordance with some embodiments.

FIG. 3 is a front left perspective view a package receptacle 100 that is configured to receive and secure packages delivered by a drone, with the front door 112 open, in accordance with some embodiments. The front door 112 is designed to block access to the interior of the main body 104 when opening the front door 112. This is accomplished by providing an interior portion 116 and an exterior portion 118 at an angle to the interior portion 116. Thus, when a handle 120 is used to open the front door 112 by pulling the handle forward and down, the exterior portion rotates downward about a base pivot line and causes the interior portion 116 to correspondingly rotate upwards to block access into the interior of the main body 104. To send mail, a retention shelf 117 can be used to hold outgoing mail without letting it fall into the interior of the main body. An extendable mail indicator 110 can be extended to indicate there is outgoing mail. Upon picking up the outgoing mail, the mail indicator 110 can be pushed back in by the postal service personnel. Mail being delivered can be placed on the interior portion 116 so that when the front door is closed the mail simply slides into the interior of the main body. The interior portion 116 can be weighted such that it biases the front door to the closed position.

Figure 4:
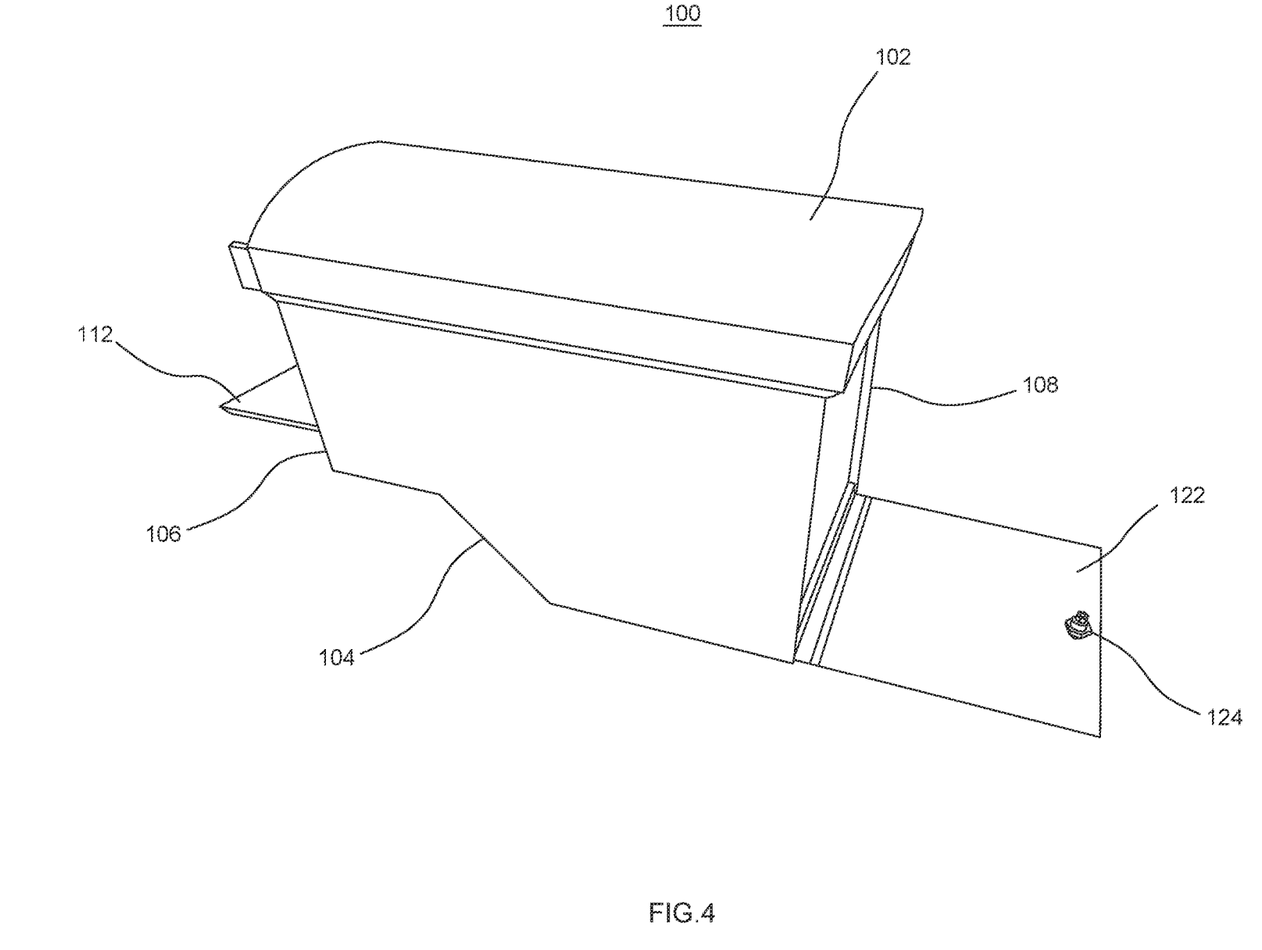
FIG. 4 is a side rear perspective view a package receptacle that is configured to receive and secure packages delivered by a drone, with the front and rear doors open, in accordance with some embodiments.

FIG. 4 is a side rear perspective view a package receptacle 100 that is configured to receive and secure packages delivered by a drone, with the front 112 and rear 122 doors open, in accordance with some embodiments. In this view the rear door 122 can be seen in an open position to allow access to the interior of the receptacle 100. The bottom of the rear door 122 can be connected at a hinge to the interior of the receptacle 100 to allow the rear door to open, rotating about the hinge. A lock 124 can be provided to selectively engage a latching feature inside the receptacle near the top of the receptacle 100. A key can be used from the outside of the rear door 122 to operate the lock to engage or disengage the latching feature. A user can thereby access and remove the contents of the receptacle 100 by unlocking and lowering the rear door 122.

Figure 5:
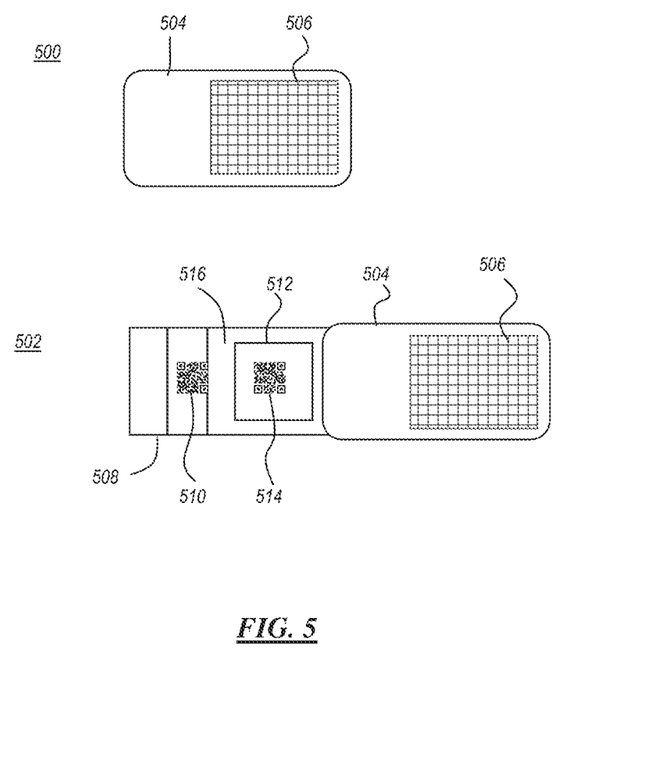
FIG. 5 is a graphical sequence diagram showing a top view of a package receptacle with lid moving between the closed and open positions, in accordance with some embodiments.

FIG. 5 is a graphical sequence diagram showing a top view of a package receptacle with lid moving between the closed and open positions, in accordance with some embodiments. The top view is the view that a drone making a delivery to the package receptacle would have. In a first state 500 the lid 504 is in a closed position, as in FIG. 1. This is the normal and default state of the package receptacle. Further, the lid 504 can have a solar cell array or matrix 506 for recharging a battery used to power the components of the package receptacle, including the drive system that opens and closes the lid 504.

In a second state 502 the lid 504 is in an open position, similar to that shown in FIG. 2. In the open position the interior 516 of the main body 508 is exposed. In the present example, a package 512 is shown in the interior 516. The package 512 has a visual identifier 514 which can be a bar code or quick read (QR) code to identify the package. Similarly a graphical receptacle identifier 510 can be provided in the interior 516 of the main body 508 to visually identify the receptacle. Upon making a delivery a drive can use a wireless network radio transceiver (e.g. WiFi, BLUETOOTH, ZIGBEE) to communicate with the receptacle, causing the receptacle to open the lid 504. The drone can confirm and verify the identity of the receptacle by visually recognizing the identifier 510. In other embodiments the receptacle can be provided with a password key for a given item being delivered, and the drone can provide the password in the initial communication where it can be confirmed by the receptacle which then open the lid 504 to receive the package. The drone can then take a picture of the package in the interior 516 of the main body 508 with both identifiers 510, 514 in view in the image as verification that the package was delivered.

Figure 6:
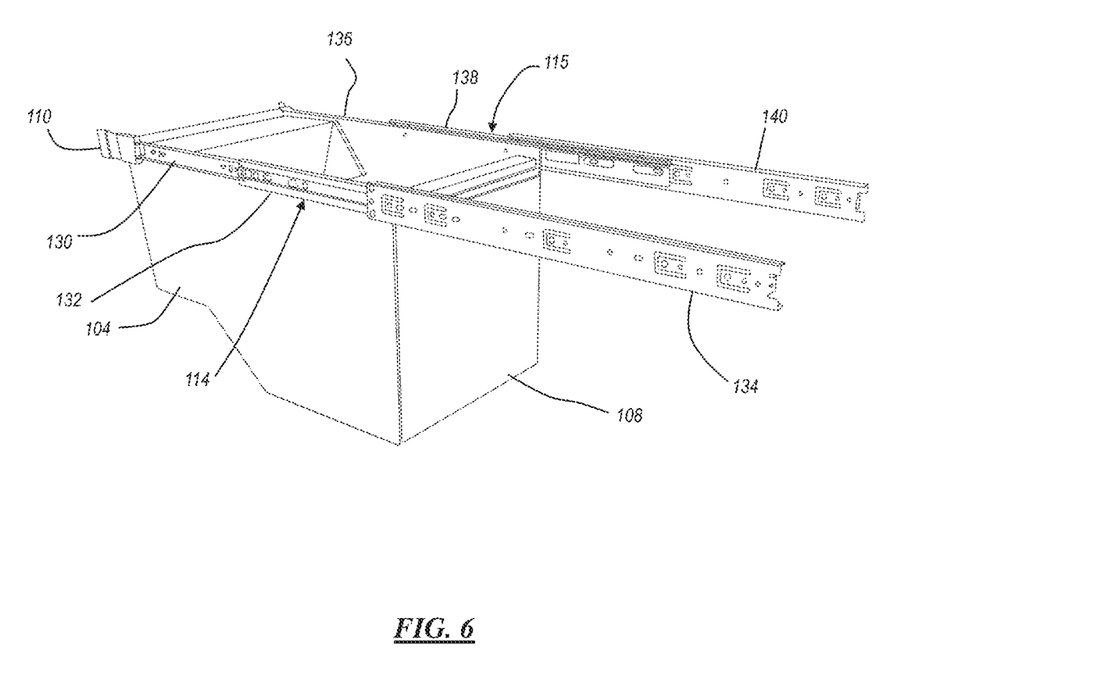
FIG. 6 is a side rear perspective view of the main body of a package receptacle with the lid removed to show the lid support structure, in accordance with some embodiments.

FIG. 6 is a side rear perspective view of the main body 104 of a package receptacle with the lid removed to show the lid support structure, in accordance with some embodiments. The lid can be supported on a pair of opposing telescoping roller tracks 114, 115. The telescoping roller tracks 114, 115 are positioned horizontally on each side of the main body 104 at the top of the main body 104, and on the outside of the main body 104, running from front to back. Each of the telescoping roller tracks have several portions including a fixed portion 130, 136 which are fixedly mounted to the main body 104 at their respective sides. An intermediate portion 132, 138 is supported by, and rolls on its respective fixed portion 130, 136. A connecting member 134, 140 is supported by, and rolls on a respective intermediate portion 132, 138. The connecting portions are fixedly coupled to the inside of the lid by conventional means. In some embodiments other forms of track or moveable supports can be used equivalently.

Figure 7:
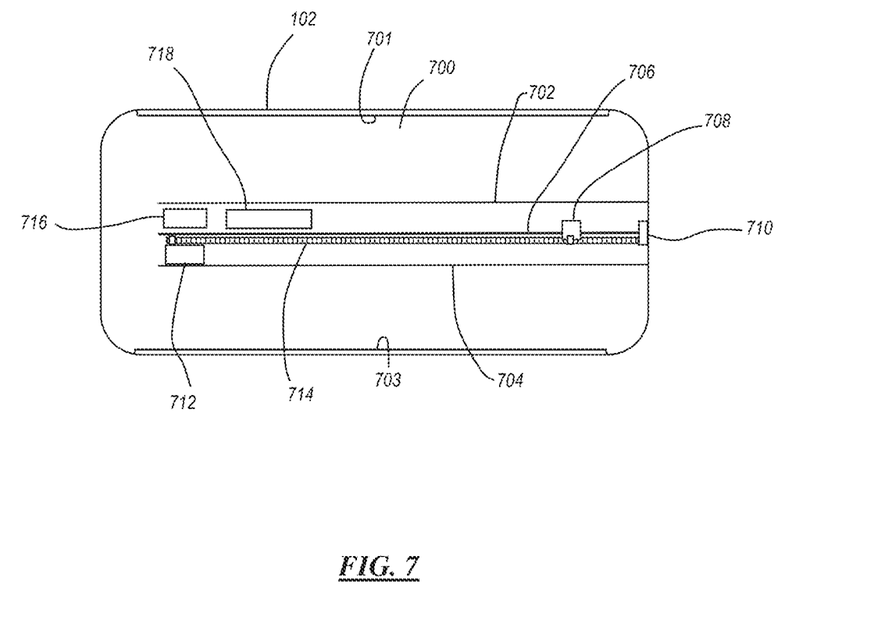
FIG. 7 is a bottom view of a lid for a package receptacle showing the drive, control, and power systems, in accordance with some embodiments.

FIG. 7 is a bottom view of a lid 102 for a package receptacle showing the drive, control, and power systems, in accordance with some embodiments. In the example shown here, all of the circuitry and most of the components to operate movement of the lid 102 are housed on the bottom 700 of the lid 102. The bottom 700 is the opposite side from the top surface seen in FIG. 5, and faces the interior of the main body of the receptacle. The telescoping roller tracks couple to the sides 701, 703 to support the lid 102 as it moves. A pair of support rails 702, 704 can run along the length of the lid, parallel to each other, generally equidistant from the centerline of the lid 102. A guide rod 706 can be mounted between the support rails 702, 704 along the centerline of the lid 102. The guide rod passes through a guide 708 and terminates in a guide stop and lock 710 which can connect to a brace or other structure of the main body. The guide 708 is attached and fixed to the inside of the main body 104, such as at the rear of the main body 104. A drive motor 712 drives a gear to turn a belt 714 that engages the guide 708 to cause the lid 102 to move relative to the guide 708, and therefore relative to the main body 104. Thus, the drive motor 712 can be activated to turn its gear in either direction, causing the lid to move accordingly between the open and closed positions. A circuit module 716 can contain the control circuitry for operating the drive motor 712 as well as the various radio network transceivers for communicating with other devices and networks as described and taught herein. The guide stop and lock 710 can also be operated responsive to operation of the drive motor 712 to engage or disengage the structure in the main body to lock and unlock the lid. A rechargeable battery 718 can be provided to power the circuitry in the circuit module 716 and the drive motor 712, and can be charged or kept charged by a solar array on the top of the lid 102 as shown in FIG. 5. Although a belt drive system is shown here, it is contemplated that other equivalent drive systems can be used, such as, for example, the guide rod 706 being threaded such as a screw/worm rod that is driven by a corresponding worm gear by the drive motor 712. By locating the drive components on the bottom 700 of the lid 102, the interior space of the main body 104 is maximized for receiving and holding packages.

Figure 8:
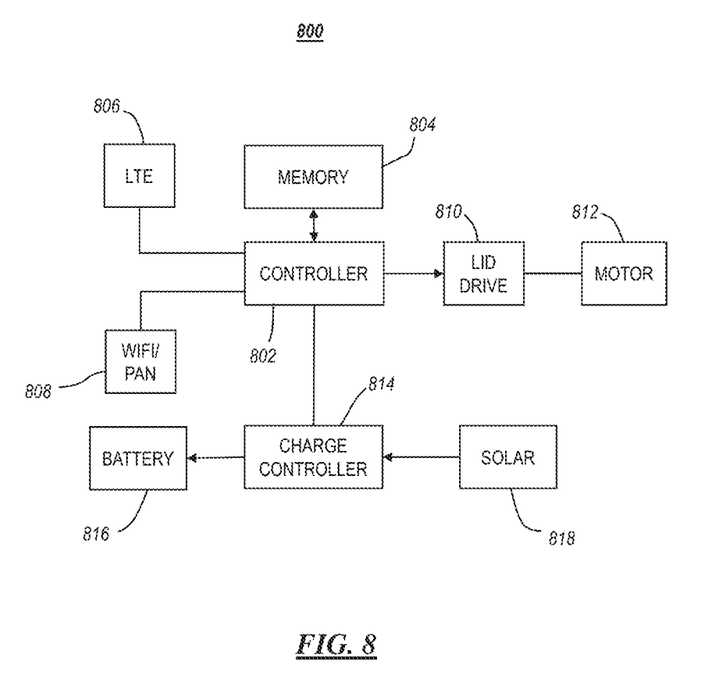
FIG. 8 is a block schematic diagram of the drive, control, and power systems of a package receptacle, in accordance with some embodiments.

FIG. 8 is a block schematic diagram 800 of the drive, control, and power systems of a package receptacle, in accordance with some embodiments. A majority of the components shown there can be included in the circuit module 716 or equivalent. The circuitry includes a controller 802 that can include a microcontroller or microprocessor that performs instruction code to produce outputs in response to various inputs. The instruction code and be stored or instantiated in a memory 804 that can include various types of memory including read only memory, random access memory, and flash memory. The controller 802 can be operably coupled to a cellular data transceiver 806 such as one operating according to the Long Term Evolution protocol. The cellular data transceiver acts as a network interface element to connect the controller 802 to a wide area network to enable communications with other devices connected to the wide area network. The wide area network can include the internet. The controller can also be operably coupled to a local wireless network transceiver 808 which can operate using WiFi or PAN networking protocols, and can be used particularly to communicate with a delivery drone during a package delivery. Both the cellular data network transceiver 806 and the local wireless network transceiver 808 have unique identifiers so that they can be identified and verified. The cellular data network transceiver 806 can have an International Mobile Equipment Identifier (IMEI) and the local wireless network transceiver can have a Media Access Controller (MAC) address. These identifiers are provided by the manufacturer of the respective transceiver and are hard coded into the circuitry, making them reliable identifiers. The controller 802 is able to send and receive information using the network transceivers 806, 808 using the various network protocols. For example, using the cellular data network transceiver 806 the controller can send and receive information using hypertext markup language (HTML) using uniform resource locator (URL) addressing.

The controller 802 is also operably coupled to a lid drive circuit 810 that controls power to the drive motor 812 to open and close the lid. When the lid is to be opened the controller 802 provides an OPEN command to the drive circuit 810 which, in response, switches current to the motor 812 to cause the motor 812 to turn in a direction that causes the lid to open so that the interior of the main body of the package receptacle is exposed to receive a package. After the package is delivered, then the controller 802 can provide a CLOSE command to the drive circuit 810, which switches current in the opposite direction to cause the lid to close, thereby protecting the package.

The controller 802 is further coupled to a charge controller 814 which controls charge from a solar array 818 to a battery 816 used to power and operate the various electrical components. The charge controller 814 can maintain a charge status of the battery 816 so that the controller can, if necessary, alert the owner/operator of the package receptacle if there is an issue with the battery 816. The controller 802 can form a battery alert message that can be transmitted via the cellular data transceiver 806 to, for example, a text message recipient, an email recipient, a server, and so on. The owner/operator of the package receptacle can then take action to address the issue, such as by replacing the battery 816 or fixing any wiring issues that may be impeding the transfer of charge from the solar array 818 to the battery 816.

Figure 9:
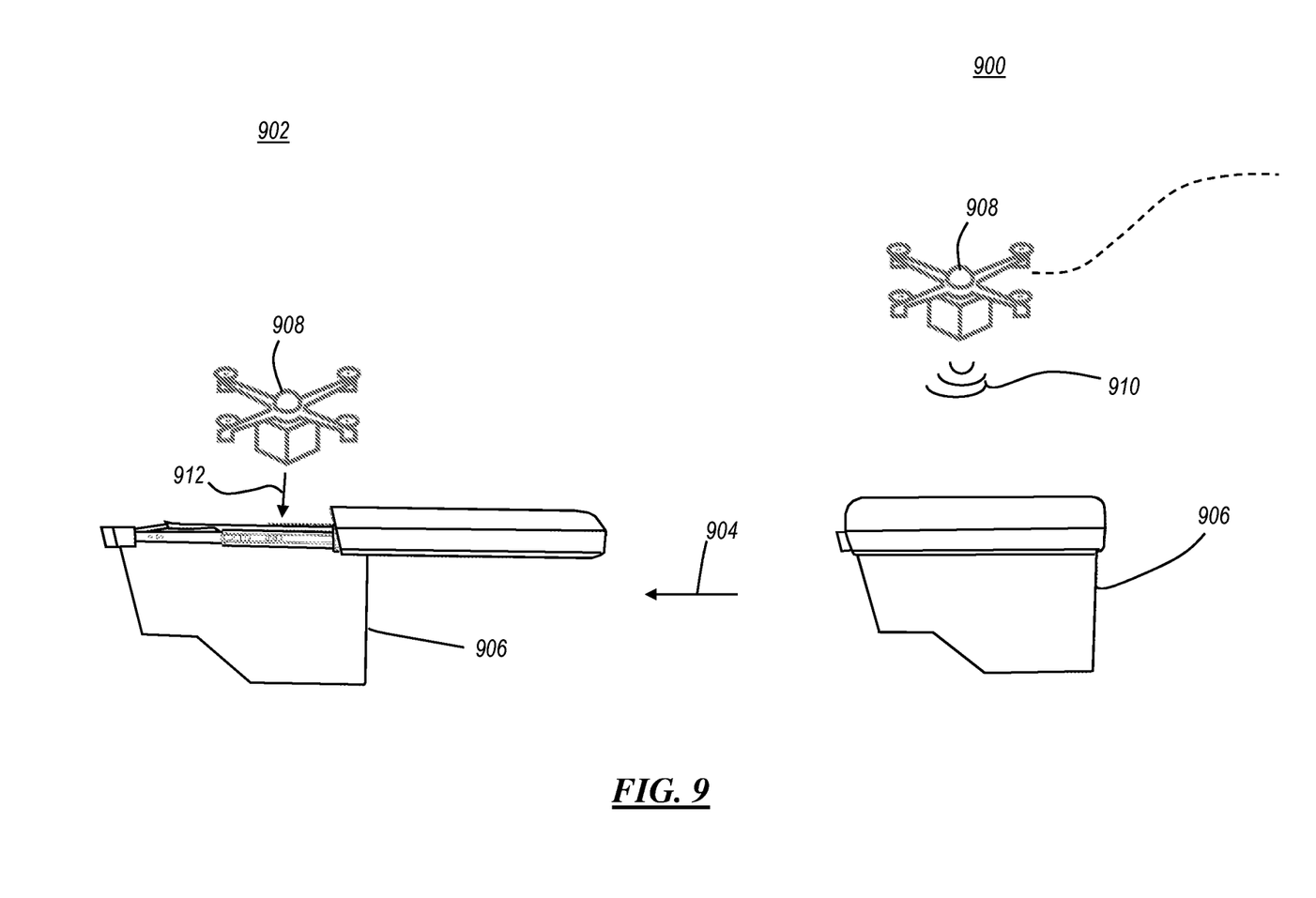
FIG. 9 is a graphical sequence diagram showing a package delivery by a drone to a package receptacle, in accordance with some embodiments.

FIG. 9 is a graphical sequence diagram showing a package delivery by a drone to a package receptacle, in accordance with some embodiments. In particular there are an approach phase 900 and a delivery phase 902 shown. In the approach phase 900 the drone 908 has been provided with the geolocation of the package receptacle 906 and flies out to the location being guided by an on-board navigation system, such as a satellite positioning system. The package receptacle can have visual indicia on the top of the lid to allow the delivery drone 908 to identity the package receptacle and align with the package receptacle. Once the package receptacle is found by the delivery drone 908 and the delivery drone 908 is in position over the package receptacle 906 the delivery drone 908 can then transmit a request 910 to the package receptacle to open the lid. The request 910 can include a pre-shared key, such as a tracking number, to ensure that the entity transmitting to the package receptacle is a valid delivery drone. Upon receiving the request 910, the package receptacle 906 (e.g. the controller) can compare the information with information it has been provided by the owner/operator of the package receptacle 906, and if there is a match, then the package receptacle can respond, both by opening the lid and by transmitting to the delivery drone that the request is authorized. Then the state transitions to phase 902 as indicated by arrow 904, where the delivery drone 908 can deposit the package into the interior of the main body of the package receptacle 906, as indicated by arrow 912. The delivery drone 908 can then confirm the package has been delivered using a visual recognition of the package in the package receptacle, as in FIG. 5, and then the delivery drone 908 can transmit conformation to the package receptacle 906, which in response will close the lid.

Figure 10:
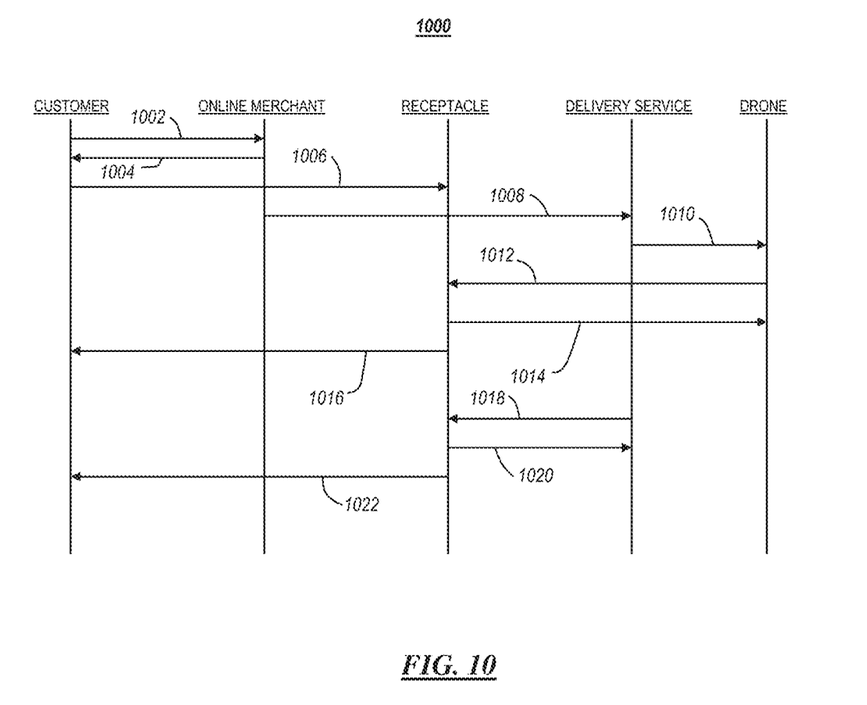
FIG. 10 is a process diagram of a process for ordering an item from a merchant and having the package delivered by a drone to a package receptacle, in accordance with some embodiments.

FIG. 10 is a process diagram of a process 1000 for ordering an item from a merchant and having the package delivered by a drone to a package receptacle, in accordance with some embodiments. The process 1000 involves a customer, an online merchant, the package receptacle, a delivery service, and the delivery drone, each having their own vertical line. In a first step 1002 the customer can interact with the online merchant to purchase an item. In the process of completing the purchase, the online merchant can indicate, in step 1004, confirmation of the purchase and an identifier to be associated with the item for delivery. Also as part of the purchase process, the customer provides a location for the delivery, which may be more specific than an address and include geo-spatial coordinates of the package receptacle. In some embodiments, the merchant or other entity can keep a database that cross references addresses with the geo-spatial coordinates of the package receptacle for that address. In step 1006 the customer can communicate with the package receptacle to provide the identifier to the package receptacle. This can be done using a cellular data network link or a local wireless network link. The identifier can be a pre-shared key that is also shared with the online merchant and/or the delivery service, or which can be generated by the online merchant or the delivery service. In some embodiments, the delivery service can generate the identifier and provide it to the customer directly, or to the customer through the online merchant.

In step 1008 the merchant provides the purchased item to the delivery service, along with delivery information, which can include the identifier. The delivery service can then provide the item to a drone that is programed to deliver the item to the package receptacle in step 1010. The drone can be driven to a location near the package receptacle, and then the drone can fly to the approximate location and in step 1012 the drone can communicate with the package receptacle, including providing the identifier, and in step 1014 the package receptacle can respond with approval, after opening the lid, where upon the drone can deliver the package into the package receptacle. In step 1016 the package receptacle can alert the owner/operator of the package receptacle that the package has been delivered. Specifically, in response to receiving an open command from a drone or other delivery entity, the package receptacle can then transmit a message to the owner/customer to indicate that a package has been received. For example, The package receptacle can transmit a text message or send an email or other such message to an indicated address or device, as set up by the owner/operator, using the cellular data network transceiver. Thereafter, the owner/operator of the package receptacle can go to the package receptacle, unlock and open the rear door, and retrieve the delivered item (and any other items that have been deposited into the package receptacle).

In cases where a delivery is made by a person, in a conventional delivery service manner, steps 1002-1008 can be performed and steps 1012, 1014 are not performed. Instead, in step 1018, the delivery service sends a deliver driver, which can be a private delivery service or the government postal service, to the location of the receptacle. The driver then uses a device to communicate with the receptacle in the same manner as in step 1012 when performed by a drone. The device can be a cellular phone device or equivalent that can either communicate directly using low power local wireless network communications similar to WiFi, or it can communicate indirectly using a cellular data communication link with an authorization entity (e.g. server) that in turn communicates with the receptacle to authorize and command the receptacle to open. In step 1020 the receptacle can open the lid to allow the delivery service driver to place a package into the receptacle. In step 1022, then, the receptacle can issue a message to the owner/operator ("customer") that the package has been received.

Embodiments of a package receptacle have been disclosed that allow automated delivery by drone in a way that secures the delivered package and therefore prevents theft of packages and verification that packages have been delivered. The disclosed embodiments allow merchants to verify that packages have been delivered with a photographic record showing the package in the customer's package receptacle. By opening and closing the lid, and locking the lid, the package receptacle can hold the package out of sight, thereby eliminating a main way in which package thieves are able to steal packages, but also the secure package receptacle resists attempt to gain access to the interior of the package receptacle. As a result, the disclosed embodiments facilitate advances in package delivery while also providing security for the customer, as well as eliminating the burden of theft on the system.

What is claimed is:

1. A package receptacle, comprising:
a main body container having an interior, a front, a back, a first side and a second side opposing each other between the front and the back, and an opening formed at the top of the main body;
a lid mounted at the top of the main body and configured to move horizontally between an open position and a closed position, wherein in the closed position the top is completely covered by the lid, and in the open position the lid is moved towards the back of the main body to expose the opening at the top of the main body;
a drive system mounted to the lid at a bottom side of the lid that moves the lid between the open and closed positions;
a controller operably coupled to the drive system and configured to control the drive system to move the lid selectively to the open position and the closed position; and
a wireless network transceiver coupled to the controller and configured to receive commands to move the lid to the open position and provide the commands to the controller;
wherein the main body comprises a front door having an interior portion and an exterior portion at an angle to the interior portion, wherein the front door is pivotally mounted at the front of the main body to allow the exterior portion to be pulled down causing the interior portion to rise up, thereby blocking access to the interior of the main body.

2. The package receptacle of claim 1, wherein the wireless network transceiver is a local wireless network transceiver, the package receptacle further includes a cellular data network transceiver.

3. The package receptacle of claim 1, further comprising a solar array mounted on a top of the lid.

4. The package receptacle of claim 1, wherein the controller is responsive to the commands, and wherein the controller is configured to operate the drive system to open the lid only when a pre-shared key is provided in an open command that matches a pre-shared key in a memory associated with the controller.

5. The package receptacle of claim 1, wherein the lid is mounted on opposing telescoping roller tracks disposed on the first side and the second side of the main body.

6. The package receptacle of claim 1, further comprising a rear door at the back of the main body that include a lock and which, when opened, allows access to the interior of the main body.

7. A postal and package receptacle, comprising:
a main body container having an interior, a front, a back, a first side and a second side opposing each other between the front and the back, and an opening formed at the top of the main body;
a lid mounted at the top of the main body and configured to move horizontally between an open position and a closed position, wherein in the closed position the top is completely covered by the lid, and in the open position the lid is moved towards the back of the main body to expose the opening at the top of the main body;
a wireless network transceiver configured to receive an open command to move the lid to an open position and to receive a close command to move the lid to a closed position;
a drive system mounted to the lid at a bottom side of the lid, the drive system including a drive motor that is powered by a battery, the drive system being configured to move the lid to the open position in response to the open command being received by wireless network transceiver, and wherein the drive system is further configured to move the lid to the closed position in response to the close command being received by wireless network transceiver;

a front door at the front of the main body that is configured to receive postal deliveries; and a rear door at the back of the main body that include a lock and which, when opened, allows access to the interior of the main body;

wherein the front door has an interior portion and an exterior portion at an angle to the interior portion, wherein the front door is pivotally mounted at the front of the main body to allow the exterior portion to be pulled down causing the interior portion to rise up, thereby blocking access to the interior of the main body.

8. The postal and package receptacle of claim 7, further comprising a graphical receptacle identifier disposed in the interior of the main body so as to be viewable when the lid is in the open position.

9. The postal and package receptacle of claim 7, further comprising a cellular transceiver that is configured to receive a pre-shared key for a package delivery, and wherein the open command includes the pre-shared key.

10. The postal and package receptacle of claim 9, wherein the drive system is configured to open the lid only when the open command includes the pre-shared key.

11. The postal and package receptacle of claim 9, wherein the postal and package receptacle is configured to transmit a message via the cellular transceiver to an owner of the postal and package receptacle upon receiving the open command.

12. The postal and package receptacle of claim 7, wherein the lid is mounted on opposing telescoping roller tracks disposed on the first side and the second side of the main body.

13. The postal and package receptacle of claim 7, further comprising a solar array mounted on a top of the lid that is coupled to the battery.

14. A method, comprising:

providing a postal and package receptacle having a main body having an opening at a top of the main body, a lid mounted at the top of the main body that is moveable horizontally between an open position and a closed position, a drive system including a drive motor mounted on the lid to move the lid between the open and closed positions, a front door at a front of the main body and a back door at a back of the main body, the postal and package receptacle further include a wireless network transceiver, wherein the front door is provided with an interior portion and an exterior portion at an angle to the interior portion, wherein the front door is provided as being pivotally mounted at the front of the main body to allow the exterior portion to be pulled down causing the interior portion to rise up, thereby blocking access to the interior of the main body;

receiving, at the wireless network transceiver, an open command;

in response to receiving the open command, the drive system moving the lid from the closed position to the open position;

receiving, at the wireless network transceiver, a close command; and in response to receiving the close command, the drive system moving the lid from the open position to the closed position.

15. The method of claim 14, wherein providing the postal and package receptacle further comprises providing the postal and package receptacle having a cellular transceiver, the method further comprises, prior to receiving the open command, receiving a pre-shared key at the postal and package receptacle via the cellular transceiver, and wherein the drive system moving the lid from the closed position to the open position is only performed when the open command includes a copy of the pre-shared key.

16. The method of claim 15, further comprising, in response to receiving the open command, the postal and package receptacle transmitting a message to an owner of the postal and package receptacle that a package has been received.

* * * * *